Jan. 7, 1947.   G. C. SZIKLAI   2,413,932
REGULATED HIGH VOLTAGE POWER SOURCE
Filed Feb. 28, 1944
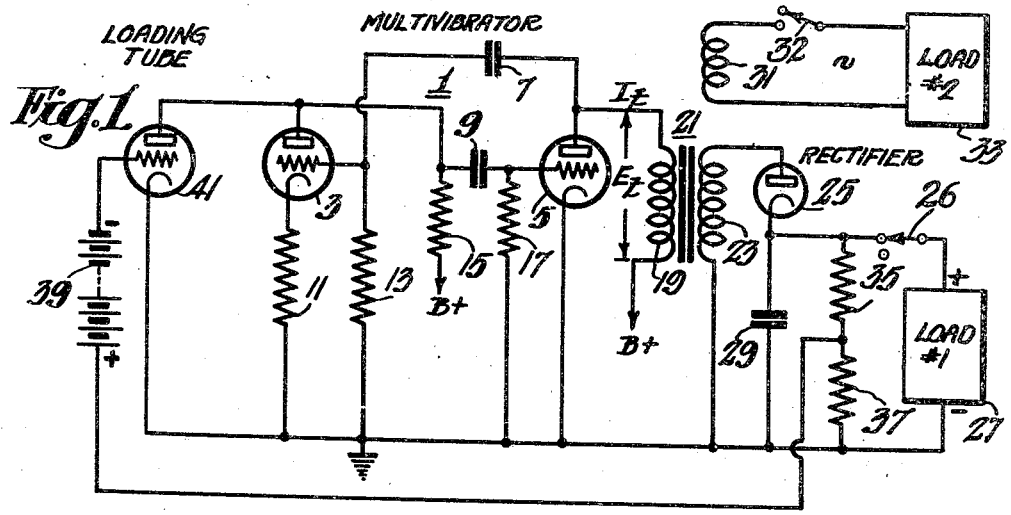
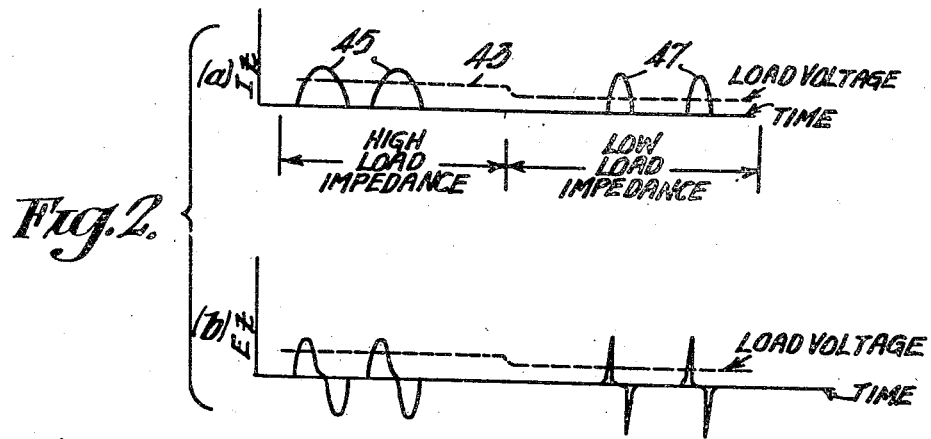
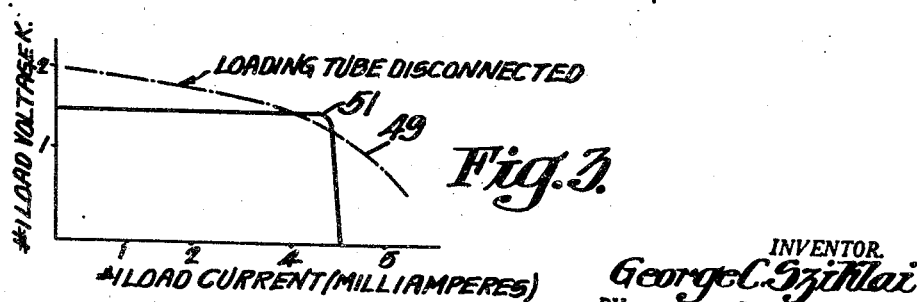
INVENTOR.
George C. Sziklai
BY
CD Tuska
ATTORNEY Patented Jan. 7, 1947

2,413,932

UNITED STATES PATENT OFFICE 2,413,932

REGULATED HIGH-VOLTAGE POWER SOURCE

George C. Sziklai, Princeton, N. J., assignor to Radio Corporation of America, a corporation of Delaware Application February 28, 1944, Serial No. 524,242

11 Claims. (Cl. 171—97)

This invention relates generally to high-voltage, low-power sources for operating electronic apparatus and more particularly to a regulated high-voltage, relatively low-current power source providing either direct or alternating currents to load devices.

Briefly, a preferred embodiment of the invention comprises a multivibrator pulse generator including a pair of thermionic discharge tubes for generating relatively narrow current pulses which are applied to the primary winding of a step-up transformer. High voltage alternating potentials derived from a secondary winding of said transformer are rectified, filtered, and applied to a load device. A portion of the rectified voltage is applied to the control electrode of a third thermionic tube to control its mutual conductance in direct proportion to the load voltage. The third thermionic tube is connected in a manner to vary the loading of the multivibrator, thereby compensating for load voltage variations. If desired, an additional secondary winding may be provided on the transformer to provide control of alternating potentials for a second load device.

Among the objects of the invention are to provide an improved method of and means for generating and regulating electrical energy supplied to a load device. An additional object of the invention is to provide an improved method of and means for controlling and regulating a voltage source. A further object of the invention is to provide a regulated direct voltage source comprising a multivibrator pulse generator, means for deriving alternating potentials from said pulses, means for rectifying said alternating potentials, means for applying said rectified potentials to a load device, and means including a loading tube for varying said generating pulses in inverse proportion to the rectified voltage applied to said load.

An additional object of the invention is to provide an improved regulated voltage source employing a multivibrator pulse generator, means for deriving relatively high direct voltages from said generator, means including a thermionic tube connected to vary the loading of said generator and means including a source of reference potential and a portion of said derived high voltage for varying said loading of said pulse generator in inverse proportion to said derived high voltage. Another object is to provide an improved voltage regulated power source wherein the regulated voltage applied to a load is effectively removed when the load current exceeds a critical predetermined value.

The invention will be described in greater detail by reference to the accompanying drawing of which Figure 1 is a schematic circuit diagram of a preferred embodiment thereof and Figures 2 and 3 are graphs explaining the operation of the circuit of Figure 1.

Referring to Figure 1, a conventional multivibrator 1 includes, for example, a pair of triode thermionic discharge tubes 3, 5. The control electrode of the first triode 3 is connected through a coupling capacitor 7 to the anode of the second triode 5. Similarly, the control electrode of the second triode 5 is connected through a second coupling capacitor 9 to the anode of the first triode 3. The cathode of the first triode 3 is grounded through a cathode resistor 11. The control electrode of said first triode 3 is grounded through a first grid resistor 13. Anode potential from an anode voltage source, not shown, is applied to the anode of said first triode 3 through an anode resistor 15.

The cathode of said second triode 5 is connected directly to ground, and the control electrode thereof is connected to ground through a second grid resistor 17. The source of anode potential is connected to the anode of the second triode 5 through the primary winding 19 of a high voltage step-up transformer 21.

The operation of a multivibrator of the type described is so well known that it is unnecessary to include herein any detailed description thereof.

It is sufficient to state that the primary winding 19 of the transformer 21, being effectively connected across the anode-cathode circuit of the second triode 5 of the multivibrator 1, will be subjected to rapidly recurring, relatively narrow current pulses which will provide relatively high alternating potentials across a high voltage secondary winding 23 of said transformer. As is well understood, the induced voltage across the transformer windings is proportional to the rate of change of the pulsed currents through the primary winding thereof. The anode of a diode rectifier discharge tube 25 is connected to one terminal of the high voltage secondary winding 23 of the transformer 21. The remaining terminal of the high voltage secondary winding 23 is connected to the negative terminal of a first load device 27. The cathode of the half-wave rectifier tube 25 is connected, through a first load switch 26, to the positive terminal of the first load device 27. Effective filtering of the rectified high alternating voltages is provided by a storage capacitor 29 connected across the load terminals. If desired, a second transformer secondary winding 31 may be connected, through a second load switch 32, to provide alternating potentials to a second load device 33.

A voltage divider, comprising the serially-connected bleeder resistors 35, 37, is connected in parallel with the storage capacitor 29. The common terminal of the bleeder resistors 35, 37 is connected to the positive terminal of a source of reference potential such, for example, as a battery 39. The negative terminal of the reference potential source 39 is connected to the control electrode of a third triode thermionic discharge loading tube 41. The anode of the third thermionic discharge tube 41 is connected to the anode of the first triode 3 of the multivibrator 1. The cathode of the third thermionic discharge tube 41 is connected to the grounded terminal of the cathode resistor 11 in the circuit of the first triode 3 of the multivibrator 1. Thus the third triode 41 provides variable loading of the anode-cathode circuit of the first triode 3 of the multivibrator. A decrease in the rectified and filtered potentials applied to the first load 27 therefore increases the negative bias applied to the control electrode of the third triode 41, to reduce the mutual conductance of the tube, and hence to reduce the effective loading provided thereby upon the multivibrator 1. As the loading of the multivibrator 1 by the third triode 41 is reduced, the characteristics of the pulses generated by the multivibrator are changed to increase the alternating potentials generated in the secondary windings 23, 31 of the transformer 21, thereby tending to compensate for the load voltage variations.

Referring to Figure 2, it will be seen that the loading tube 41 has a damping action upon the voltage pulses generated by the multivibrator 1, whereby an increase in the anode-to-cathode impedance of the loading tube 41 due to a decrease in the rectified output voltage applied to the first load 27, provides a narrowing of the voltage pulses generated by the multivibrator resulting in a higher induced alternating potential across the secondary winding 23 of the transformer 21, due to the more rapid rate of change of the primary current thereof, compensate for the variations in said rectified load voltages. It will be seen that the alternating potentials derived from the second secondary winding 31 of the transformer 21 will be controlled in a similar manner by variations in the first load voltage.

In Figure 2, graph $a$ typifies the transformer primary current $I_t$ with respect to time for two different values of load voltage, represented by the dash line 43. It will be seen that for relatively high values of load voltages, corresponding to a high load impedance, the current pulses 45 are relatively broad whereby the rate of change of primary current has a relatively low value. It further will be seen that for reduced load voltage, due to reduced load impedance, the current pulses 47 will be relatively narrower than the current pulses 45, thereby providing a higher rate of change of current through the transformer primary winding 19.

Graph $b$ typifies the corresponding induced voltages $E_t$, with respect to time, induced in the transformer windings by the current pulses 45, 47 of graph $a$. It will be seen that for conditions of reduced load voltage, due to reduced load impedance, that the voltage pulses induced in the transformer windings will be relatively narrower and of greater amplitude than the induced voltages under conditions of relatively high load impedance.

An advantage of the voltage regulated power source thus described is that as the load impedance is reduced below, or the load current increased to, some critical value, as illustrated in graphs of Figure 3, the loading upon the multivibrator 1 becomes so great that it ceases to oscillate, thereby removing all load potential and providing an important safety feature when the circuit is employed to supply relatively high operating voltages to electronic apparatus. Graph 49 illustrates typical load voltage with respect to load current in the circuit of Fig. 1, with the loading triode 41 disconnected by opening its anode circuit at the point $x$. Graph 51 illustrates the improved regulation and critical load current characteristics of the circuit including the loading tube as described heretofore.

Thus the invention described comprises an improved voltage-regulated low power source comprising a multivibrator for generating voltage pulses which are converted to rectified, relatively high, direct voltages at relatively low current values for use with electronic apparatus. Regulation of load voltage is provided by means of a loading thermionic tube connected across the anode-cathode circuit of one of the multivibrator thermionic discharge tubes. If desired, regulated alternating potentials may be applied to a second loading device.

I claim as my invention:

1. A regulated high voltage power source including a multivibrator pulse generator having a pair of thermionic discharge tubes, means loading one of said pair of tubes for converting voltage pulses derived from said one tube to high alternating potentials, means for rectifying said alternating potentials, means for loading the other of said pair of tubes, and means responsive to at least a portion of said rectified potentials for varying said loading of said other of said pair of tubes to compensate for variations in said rectified potentials.

2. Apparatus of the type described in claim 1 including a load responsive to said rectified potentials.

3. Apparatus of the type described in claim 1 including a load responsive to said alternating potentials.

4. A regulated high voltage power source including a multivibrator pulse generator having a pair of thermionic discharge tubes, transformer means loading one of said pair of tubes for converting voltage pulses derived from said one tube to high alternating potentials, means for rectifying said alternating potentials, means for loading the other of said pair of tubes, and means responsive to at least a portion of said rectified potentials for varying said loading of said other of said pair of tubes to compensate for variations in said rectified potentials.

5. A regulated high voltage power source including a multivibrator pulse generator having a pair of thermionic discharge tubes, means loading one of said pair of tubes for converting voltage pulses derived from said one tube to high alternating potentials, means for rectifying said alternating potentials, third tube means for loading the other of said pair of tubes, and means responsive to at least a portion of said rectified potentials for controlling the mutual conductance of said third tube for varying said loading of said other of said pair of tubes to compensate for variations in said rectified potentials.

6. A regulated high voltage power source including a multivibrator pulse generator having a pair of thermionic discharge tubes, shunt-connected transformer means loading one of said pair of tubes for converting voltage pulses derived from said one tube to high alternating potentials, means for rectifying said alternating potentials, third tube means for loading the other of said pair of tubes, means responsive to at least a portion of said rectified potentials for controlling the mutual conductance of said third tube for varying said loading of said other of said pair of tubes to compensate for variations in said rectified potentials, means for filtering said rectified potentials and a load device responsive to said rectified potentials.

7. Apparatus of the type described in claim 6 including a source of reference potential and means for applying said reference potential to bias said third tube.

8. Apparatus of the type described in claim 6 including load connecting means, means for applying said rectified potentials to said load connecting means, and wherein said loading of said generator by said third tube effectively prevents generation of said pulses for load currents exceeding a critical value.

9. A regulated high voltage power source including an A.-C. generator including a thermionic tube having at least anode and cathode electrodes, first means shunt loading said generator for deriving from said generator high alternating potentials, and second degenerative shunt loading means connected between said anode and cathode electrodes and responsive to at least a portion of said potentials for varying the shunt-anode-cathode loading of said generator to compensate for variations in said potentials.

10. A regulated high voltage power source including a pulse generator including a thermionic tube having at least anode and cathode electrodes, first means shunt-loading said pulse generator for converting pulses derived from said generator to high alternating potentials, means for rectifying said alternating potentials, and second degenerative shunt-loading means connected between said anode and cathode electrodes and responsive to at least a portion of said rectified potentials for varying the shunt-anode-cathode loading of said generator to compensate for variations in said rectified potentials.

11. A regulated high voltage power source including a pulse generator including a thermionic tube having at least anode and cathode electrodes, first means shunt-loading said pulse generator for converting pulses derived from said generator to high alternating potentials, and second degenerative shunt-loading means connected between said anode and cathode electrodes and responsive to at least a portion of said potentials for varying the shunt-anode-cathode loading of said generator to compensate for variations in said potentials, said second loading means effectively blocking the generation of said pulses for loading of said generator by said first loading means exceeding a critical value.

GEORGE C. SZIKLAI.